Oct. 15, 1929.  A. SCOTT  1,731,442
TROLLEY EAR
Filed May 29, 1928
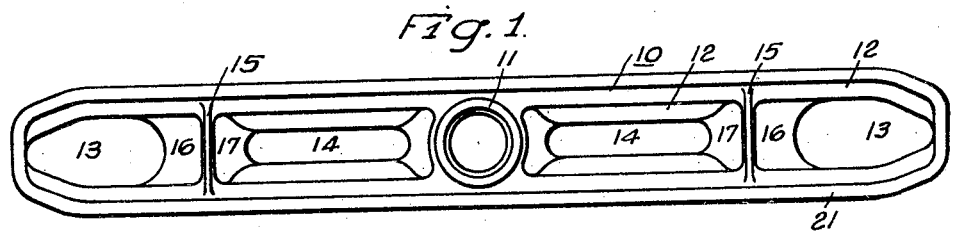
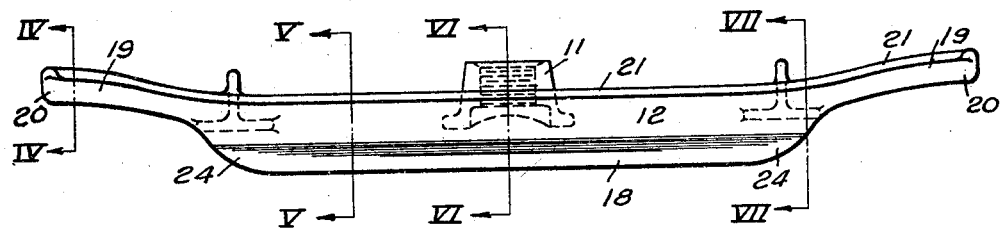
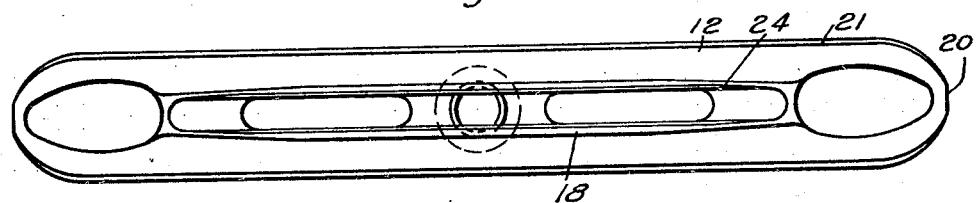
 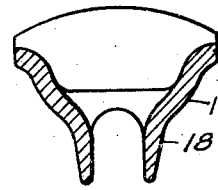 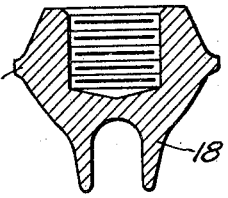 
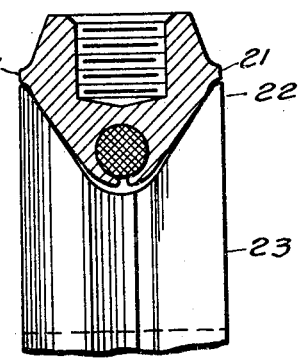
INVENTOR
*Angus Scott.*
BY
*Wesley G. Carr*
ATTORNEY Patented Oct. 15, 1929

1,731,442

UNITED STATES PATENT OFFICE

ANGUS SCOTT, OF CLEVELAND, OHIO

TROLLEY EAR

Application filed May 29, 1928. Serial No. 281,439.

My invention relates generally to trolley ears and more particularly to trolley ears in which all the members are combined in a single integral structure.

Heretofore, difficulty has been experienced in designing trolley ears in which the trolley-conductor-engaging lips are not quickly worn by the trolley wheel and damaged by the arcing which occurs as a result of the engagement and disengagement of the trolley wheel and the lip member.

When no provision is made for preventing the trolley wheel from engaging the lip members of the ear, the abrasive action of the wheel wears the lip members, thereby weakening them to such an extent that they are not strong enough to support the conductor.

Since the lip members cannot be attached to the trolley conductor to provide a comparatively smooth joint, the trolley wheel, when engaging with, and disengaging from, the ear, is momentarily held out of engagement with the conductor which causes arcing. This arcing action is concentrated on the conductor at the tips of the lip members and results in undesirable pitting and fusing.

The object of my invention, generally stated, is to provide a one-piece trolley ear which shall be simple in construction and economical to manufacture and install.

A more specific object of my invention is to provide for protecting the conductor-engaging lip members of a trolley ear from an abrasive action of the trolley wheel, and the arcing caused by their engagement with, and disengagement from, the trolley wheel.

These objects may be accomplished by constructing the trolley ear with beadings along the upper edges of the side walls and shaping the walls and beadings so that the latter, receive the trolley wheel, when it reaches an end of the ear, and carries it down and away from the trolley conductor and lip members and returns it to the trolley conductor without permitting it to ride on the lip members.

These and other objects will become evident from the following description, when taken in conjunction with the accompanying drawing, in which, Figure 1 is a top plan view of a trolley ear embodying my invention;

Fig. 2 is a view in side elevation;

Fig. 3 is a bottom plan view,

Figs. 4, 5, 6 and 7 are cross-sectional views, taken along the lines IV—IV to VII—VII, inclusive, respectively; of Fig. 2; and Fig. 8 is a sectional view on the lines VI—VI of Fig. 2, showing a trolley conductor clamped to the ear, and a trolley wheel positioned directly underneath the center of the ear.

Referring now to the drawing and Figs. 1, 2 and 3 in particular, the trolley ear is shown as constructed in one piece and comprises a body member 10 which carries the other members required in the structure.

In order to support the ear, a boss 11 is provided which is formed integral with the body member 10. As shown, the boss 11 is integrally threaded to receive the connecting member of a suitable insulating hanger, (not shown).

Since economy of construction is a very desirable feature, provision is made for utilizing a minimum amount of material, and still provide sufficient strength and adequate wearing surface in the parts of the ear which are subjected to the greatest wear.

It will be observed that the body member 10 is of hollowed-out or boat-shape construction having the supporting boss 11 cast in the center to provide a strong center section where the maximum strain occurs.

Referring to Fig. 1 and the cross-sectional views of Figs. 4 to 7, inclusive, it will be observed that practically the entire top of the body member 10 is hollowed out, leaving relatively thin side members 12, which converge and join at the ends. To further reduce the amount of material required, the body member is provided with elongated openings 13 and 14. Rib members 15, and webs 16 and 17, being cast integral with the side members, increase the rigidity of the body.

The body member 10 is provided with lip members 18 for clamping and supporting the trolley conductor in the usual manner. As shown, the lip members 18 are formed integral with the side members 12 of the body member 10, being continuations or extensions of the side members.

It will be observed that the body member 10 is provided with upwardly curved end members 19 which extend above the lip members 18, for a purpose which will be described hereinafter.

In order to protect the lip members, provision is made for disengaging the trolley wheel from the conductor as it nears the lip members.

It will be observed that the side members 12 of the body member are provided with laterally extending flanges or beadings 21, which are formed integral with the upper edges of the side members. Referring particularly to Fig. 8, it will be observed that the flange members 21 are disposed to receive the rims 22 of the trolley wheel 23. It will be readily understood that, by properly shaping the outer surfaces of the side members 12, by proportioning the width of the body member with respect to the shape and width of the groove in the trolley wheel 23, and properly locating the flange members 21, the bottom of the trolley wheel groove may be retained out of engagement with the lip members 18.

It will be noted that the sides of the body member 10 after the lip members 18 have been clamped around the trolley conductor, form a cross sectional shape simulating the contour of the groove in the trolley wheel 23. In view of this, it will be apparent that the wear on the flange members 21 and the tips of the rims 22 will not be excessive, since the trolley wheel also has a bearing surface near the tops of the side members 12. While the flanges 21 are provided chiefly for receiving the rims 22 of the trolley wheel, it will be readily understood that, in some instances, trolley wheels, having grooves of various widths, will be required to pass over the ear. Since the rims of the wheels cannot, in all cases, engage the flange members 21, the sides of the groove in the trolley wheel being of the same relative shape as the side walls 12, will present a bearing surface which will retain the bottom of the groove out of engagement with the lip members, even though the rims of the wheels do not engage the flange members 21.

As has been pointed out hereinbefore, one of the objects of the invention is to prevent the occurrence of arcing between the trolley wheel and the tips 24 of the lip members 18, which may be accomplished by disengaging the trolley wheel from the conductor before the tips 24 are reached. Since it is desirable to carry the trolley wheel away from the trolley conductor before engagement with the tips 24 of the lip member 18 can occur, the end members 19 are so positioned, with respect to the trolley conductor, that the trolley wheel is engaged by the end members 19 while it is still in contact with the trolley conductor.

When referring to Fig. 3, it will be observed that the side members comprising the end members 19 curve inwardly toward the center line and thus are of less width than the section through the center of the ear. Being of less width than the rims of the trolley wheel, provision is made for permitting the wheel to engage the tip 20 of the end members 19 smoothly and thus any tendency to quickly throw the wheel out of contact with the conductor is prevented. The flanges 21 are disposed to extend longitudinally to the tips of the end members 21, and, therefore, it is evident that the rims 22 of the trolley wheel are gradually and gently received by the flanges 21, while the trolley wheel is still engaging the trolley conductor.

After the trolley wheel has once engaged the trolley ear, it is desirable to disengage it from the trolley conductor before it reaches the tips 24 of the lip members 18. In order to accomplish this, the end members 19 and the flange members 21 are curved so that the trolley wheel will be gradually carried downward and out of engagement with the trolley conductor, as it moves toward the central section of the ear. Therefore, the trolley wheel is carried completely out of engagement with the trolley conductor before it reaches the lip members 18.

It will be readily understood that the shape of the end member 19 also provides for permitting the trolley wheel to engage the trolley conductor smoothly and without arcing after it has passed the lip members 18.

It will be evident from the foregoing description, that, in utilizing this construction for trolley ears, a much heavier and stronger lip member may be utilized, since it is unnecessary to provide for obtaining a smooth joint between the lips and the trolley conductor. Since the lip members may be of more rugged design, the care and expense in manufacture may be greatly reduced over that of the ordinary type of trolley ear. Furthermore, since provision is made for receiving the rims of the trolley wheel to effect its movement out of engagement with the conductor, by a portion of the trolley ear which may be of more rugged construction than the lip members, any wearing action which may occur is of small consequence. Therefore, a longer life for the ear is assured.

It may be stated, in conclusion, that, while the illustrated example constitutes a practical embodiment of my invention, I do not wish to limit myself strictly to the exact details herein illustrated, since modifications of the same may be made without departing from the spirit, of the invention as defined in the appended claims.

I claim as my invention:

1. A trolley ear for supporting trolley conductors comprising an elongated body member having upwardly curved ends, and curved side walls merging into integral depending lips for engaging a trolley conductor, laterally extending flanges formed integral with the body member at the upper edges of the side walls, said flanges being disposed to receive the rims of the trolley wheel to retain it out of engagement with said lips, and a boss formed integral with the body member for mounting the ear.

2. A trolley ear for supporting trolley conductors and receiving the rims of grooved trolley wheels comprising an elongated body member having side walls presenting curved faces which converge toward the bottom, lips for engaging the trolley conductor and formed integral with the body member, said side walls merging into the lips to present a cross-sectional shape to conform substantially to the shape of the groove in the trolley wheel, integral rib portions provided along the upper edges of the side walls, and disposed to engage the rims of the trolley wheel to provide a definite clearance between the lips and the bottom of the groove in the trolley wheel, and a boss formed integral with the body member for supporting the ear.

3. A one-piece trolley ear for supporting trolley conductors to be engaged by trolley wheels comprising an elongated body member having upwardly curved ends and side walls merging into integral depending lips for engaging a trolley conductor, laterally extending flanges formed integral with the body member at the upper edges of the side walls and curving upwardly with the ends of the body, said flanges being disposed to receive the rims of the trolley wheel and to gradually carry the trolley wheel downwardly away from the trolley conductor to prevent it from engaging the lips of the trolley ear, and a boss formed integral with the body member for supporting the ear.

4. A trolley ear for supporting trolley conductors comprising a body member of boat-shape having upwardly and outwardly flaring side walls provided with convex faces and lip members integral with the body member for engaging the trolley conductor, said walls merging into integral conductor-supporting lip members, end portions curving upwardly from the horizontal plane of the integral lip members, laterally extending beads formed integral with the side walls and extending along the upper edges of the side walls and upwardly curving end portions, said beads being disposed to receive the rims of the trolley wheel to retain the bottom of the trolley wheel groove out of engagement with the lip portions when clamped around the conductor, and a supporting boss formed integral with the body members.

5. A one-piece trolley ear comprising a body member having a supporting boss, depending lip portions formed integral with the body member for clamping a trolley conductor, said body member having curved side walls disposed to engage the rim of a trolley wheel to carry the wheel downwardly as it passes underneath the ear to prevent engagement with the lip portions.

6. A trolley ear comprising a single body member having bendable lip portions for clamping a trolley conductor and provided with side portions extending upwardly and outwardly from the lip portions, said side portions being shaped to receive the groove of a trolley wheel and having beaded portions disposed to engage the rim of the trolley wheel to force said wheel out of engagement with the trolley conductor to prevent it from engaging the lip portions.

7. In a trolley-conductor support, in combination, a one-piece body member, depending lips provided on the body member to constitute a conductor-receiving channel, said lips being malleable to permit them to be set in different positions, the upper portion of the body member being shaped to provide trolley-wheel-receiving members, and a boss provided on the body member for mounting the trolley ear.

8. In a trolley ear for supporting trolley conductors to be engaged by trolley wheels, in combination, a body member, a supporting boss formed integral with the body member, depending lips formed integral with the body member for supporting the trolley conductor, said lips extending in longitudinal relation to the body member, the said body member having sides which extend upwardly and outwardly from the depending lips to provide for gradually lifting the trolley wheel from the trolley conductor and supporting lips as it approaches the center of the ear and for gradually bringing the trolley wheel into contact with the trolley conductor after the center portion of the ear has been passed.

In testimony whereof, I have hereunto subscribed my name this 22d day of May, 1928.

ANGUS SCOTT.